United States Patent Office 3,819,837
Patented June 25, 1974

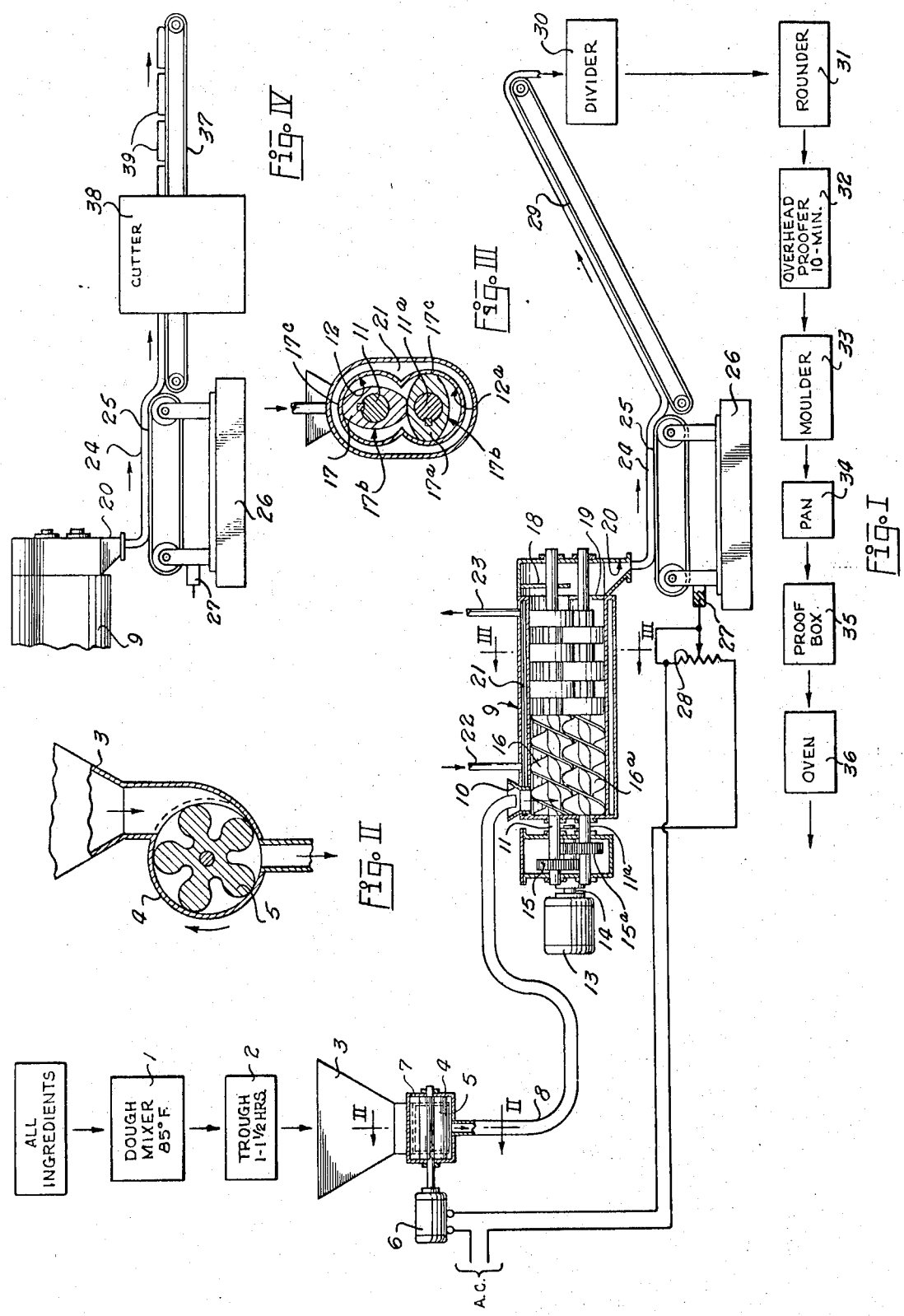

3,819,837
CONTINUOUS DOUGH MAKING PROCESS
Billy M. Keith, James R. Bussey, Sidney E. Cannon, James C. Patton, Donald W. Hatch, Perry G. Fisher, Joseph H. Caldwell, and Ralph H. Crocker, Jr., Dallas, Tex., assignors to Campbell Taggart, Inc., Dallas, Tex.
Filed Feb. 2, 1972, Ser. No. 222,905
Int. Cl. A21c 1/06; A21d 8/02
U.S. Cl. 426—27
1 Claim

ABSTRACT OF THE DISCLOSURE

A continuous dough making process wherein all the ingredients of the dough are mixed, the mixture is deposited in a pump which pumps same through a conduit and deposits same in a developer where it is alternately stretched and compressed to knead same by interengaging rotatable vanes or paddles as it is passed therethrough at a regulated temperature, and the dough is extruded from the developer through an outlet passage onto a weighing conveyor which automatically controls the rate of feeding the dough to the developer and thereby the rate of feeding same therefrom, and continuously dividing, rounding, proofing, molding and panning the dough for deposit in the proof box and therefrom into the oven.

BACKGROUND OF THE INVENTION

The present process for making bakery type sponge and dough bread involves a multiplicity of steps and several hours time for the making of each batch and the mixing of ingredients at different stages of preparation.

The process now employed includes the mixing of about 70% of the flour, about 56% of the water, yeast, shortening and yeast food in a so-called "sponge" mixer where it is agitated and mixed. From the mixer the dough is deposited in a trough and stored in a fermentation room for a period of approximately four hours. The fermented mixture is then deposited in another dough mixer and the balance of the flour, water, sugar, milk and salt are added. It is again agitated and mixed for a period of about ten minutes. The dough is then deposited in another trough where it remains for a period of about thirty minutes for proofing. It is then passed to a divider where it is divided up into suitable segments, and is passed through a rounder where the segments are rolled and shaped. From the rounder it is deposited on an overhead proofer where it remains for approximately six minutes from whence it is deposited into a molder which forms the portions into suitable shape from which it is deposited in pans and passed into a proof box where it remains for a period of time before being placed in the oven for baking.

Heretofore no suitable continuous process for making quality, sponge and dough type bread has been devise. So-called "Batter Whipped" bread has been made which involves the fermentation of the non-flour ingredients of the dough before adding flour, but it is recognized that such process does not produce a quality bread comparable to that made by the hereinbefore related conventional process.

SUMMARY AND OBJECTS OF THE INVENTION

We have devised a continuous dough making process, as hereinafter described, which shortens the time for mixing and processing the dough, and at the same time produces a superior quality of bread or rolls comparable to or better than that which has been heretofore produced by the conventional process hereinbefore described.

Among the objects of the invention are the following:
A continuous process for making and forming dough wherein all ingredients of the dough are mixed and same is continuously passed through a developer for working and kneading same and is then divided into proper sizes and forms for baking.

A continuous dough making process which considerably reduces the time for making sponge bread.

A continuous dough making process wherein all ingredients of the dough are mixed simultaneously and conveyed by a pump into a developer where it is continuously kneaded from whence it is passed onto a conveyor which conveys it to divider from which it is passed to a rounder, an overhead proofer, a molder, into a pan, and into the proof box, from whence it is deposited in the oven.

A continuous process for making dough wherein all of the ingredients of the dough are simultaneously mixed and pumped into a developer where the dough is kneaded and developed from whence it is deposited upon a weighing conveyor which automatically weighs pre-selected increments thereof, which weighing conveyor is associated with a sensor which regulates the speed of rotation of the pump and thereby the rate of supply of dough to the developer.

A process for making dough which eliminates the necessity for premixing and fermentation of the dough prior to adding the final ingredients thereto, thereby saving approximately four hours of time in the dough making process for sponge or dough bread.

Other and further objects of the invention will become apparent upon reading the detailed specification hereinafter following and by referring to the drawing annexed hereto.

DESCRIPTION OF THE DRAWING

The process and apparatus employed in the practice thereof are shown in the attached drawing wherein:
FIG. I is a diagrammatic view showing the continuous dough making process;
FIG. II is a sectional view taken along the line II—II of FIG. I;
FIG. III is a sectional view taken along the line III—III of FIG. I; and
FIG. IV is a side elevational view of a modified form of the delivery end of the device as it would be used for making rolls.

DESCRIPTION OF A PREFERRED EMBODIMENT

As shown in the drawing all ingredients going into the making of the dough, including flour, water, yeast, shortening yeast food, sugar, leavener, milk and salt are placed in the dough mixer 1 and are thoroughly mixed by a suitable agitator while it is preferably maintained at a temperature of about 85°. After so mixing, the dough is deposited in a trough 2 where it is allowed to ferment for a period of about one to one and one-half hours. From the trough 2 the dough is deposited into the hopper 3 of a dough pump 4 having vanes 5 therein rotated by a suitable motor 6. Bleeder vents 7 are provided in the wall of the pump housing to discharge gas generated by the dough. The dough is continuously fed by the dough pump, at a controlled rate, through a conduit 8 to a developer 9 through hopper 10. Developer 9 has parallel shafts 11 and 11a rotatably disposed in parallel intersecting cylinders 12 and 12a therein, said shafts being rotated in the same direction by a motor 13 through gears 14 and 15 mounted on the shafts. Each shaft 11 and 11a has interengaging flighted conveyors 16 and 16a thereon at the entry end of the developer, and interengaging vanes or paddles 17 and 17a spaced thereon communicating with a tapered discharge passage 20 through which the dough is discharged. The baffles 18 and 19 direct the dough toward the passage 20. The developer hereinbefore described is of the type disclosed in U.S. Pat. No. 3,195,868. As shown in said patent the vanes 17 and 17a are rotatable in intersecting cylinders 12 and 12a in the body of the developer, and in cross section the vanes have convex flanks 17b joined at both outer ends by arcuate crests 17c formed on a radii equal to the radius of the cylinders in which they rotate so that the vanes continuously wipe the flanks thereof and the inner surface of the cylinders as they rotate 90° out of phase. The paddles 17 and 17a are so mounted and rotated out of phase that the dough passing therebetween is alternately stretched, compressed, and kneaded between the opposed surfaces thereof so that by the time it passes between the interengaging vanes to the outlet 20 the dough is thoroughly mixed, developed and kneaded and is ready for final processing. The paddles 17 and 17a are rotated at a pre-selected speed consistent for proper kneading of the dough.

A heat exchange jacket 21 is disposed about the developer body 9 to regulate the maximum temperature of the dough as it passes therethrough. Refrigerant such as refrigerated water may be circulated through jacket 21 by means of inlet conduit 22 and outlet conduit 23. Preferably the dough should be discharged from the developer at a temperature between 90–95° F. and the speed of rotation of the developer paddles 17 and 17a should be such as to assure that thorough mixing, development, and kneading is accomplished. Good results have been attained by rotating the paddles at a speed of 190–198 r.p.m. with the developer hereinbefore described, but it will be understood that such will vary, depending upon the viscosity of the dough and the specific type of developer employed.

Other types of dough developers could be employed. For instance, the vanes could be square in shape and in the form of parallel interengaging vane type convolutions such as shown in U.S. Pat. No. 2,778,482, or they could be arranged in different patterns such as shown in U.S. Pat. No. 3,216,706, or they could take the form of a cylindrical tapered form with vanes thereon coacting with projections on the inner surface of the casing, as shown in U.S. Pat. No. 2,505,125. The only requirement is that the vanes or paddles alternately stretch, compress and knead the dough as it passes therethrough, that there be sufficient number of vanes or paddles to thoroughly develop and knead same, and that the dough pass therethrough at a controlled rate and temperature consistent with the type of developer employed and the viscosity of the dough.

Upon being extruded through the tapered passage 20 the dough is deposited in a continuous stream 24 on the weighing conveyor belt 25 which intermittently weighs dough deposited on the belt in selected increments in order to regulate the output of the developer 9. If less than the selected increment is deposited on the weighing conveyor 25 a conventional counterbalance mechanism in the base 26 moves the arm 27 to thereby operate and lower the resistance of the rheostat 28 to speed up pump motor 6 to thereby deliver more dough to developer 9, and if more than the selected increment the rheostat 28 is operated and increased through arm 27 to slow up motor 6 to deliver less dough to developer 9. From the weighing conveyor 25 the dough is deposited on a conveyor 29, the speed of which is regulated so that the dough remains thereon for about five minutes to permit additional proofing. The dough is then passed through a divider 30 where it is divided into suitable portions and into a rounder 31 where it is shaped. It passes from the rounder to an overhead proofer 32 where it remains for about ten minutes from which it is passed to a molder 33 where the portions are molded into suitable shape and placed in pans 34 which are passed into a proof box 35 for proofing, and thence to an oven 36 for baking.

This continuous process hereinbefore described shortens the time for making conventional sponge and dough type bread by a period of from three to five hours, yet makes a superior quality of bread with good flavor, volume and bright crumb.

When the method is employed to make rolls the dough 24 is deposited from the weigher conveyor 25 directly on a cutter conveyor 37 and is passed through a cutter 38 where it is cut into suitable portions 39 for rolls.

Having described our invention we claim:

1. A continuous dough making process comprising, the mixing of all the ingredients of the dough; allowing the mixture to ferment for a pre-selected period of time; depositing the mixture into a dough pump; moving the dough under pressure through a conduit to a dough developer; passing the dough between interengaging paddles rotatable in intersecting cylinders in said dough developer, said paddles having convex flanks joined at both ends by arcuate crests formed on a radii equal to the radius of the cylinder in which they rotate, said vanes being disposed and rotated out of phase to thereby alternately stretch and compress the dough to knead same; the circulation of coolant through the wall of the developer to maintain the dough at a pre-selected temperature while passing through the developer; extruding the dough through an outwardly converging passage from the developer onto a conveyor; generating a signal responsive to the weight of dough deposited on the conveyor; and applying the signal to the dough pump to control the speed thereof and thereby the rate of dough delivered by the pump to the developer.

References Cited
UNITED STATES PATENTS

| 3,234,027 | 2/1966 | Jertson et al. | 99—90 CB |
| 3,601,064 | 8/1971 | Jackel | 99—90 R |

RAYMOND N. JONES, Primary Examiner

J. R. HOFFMAN, Assistant Examiner

U.S. Cl. X.R.

426—231